Patented May 26, 1925.

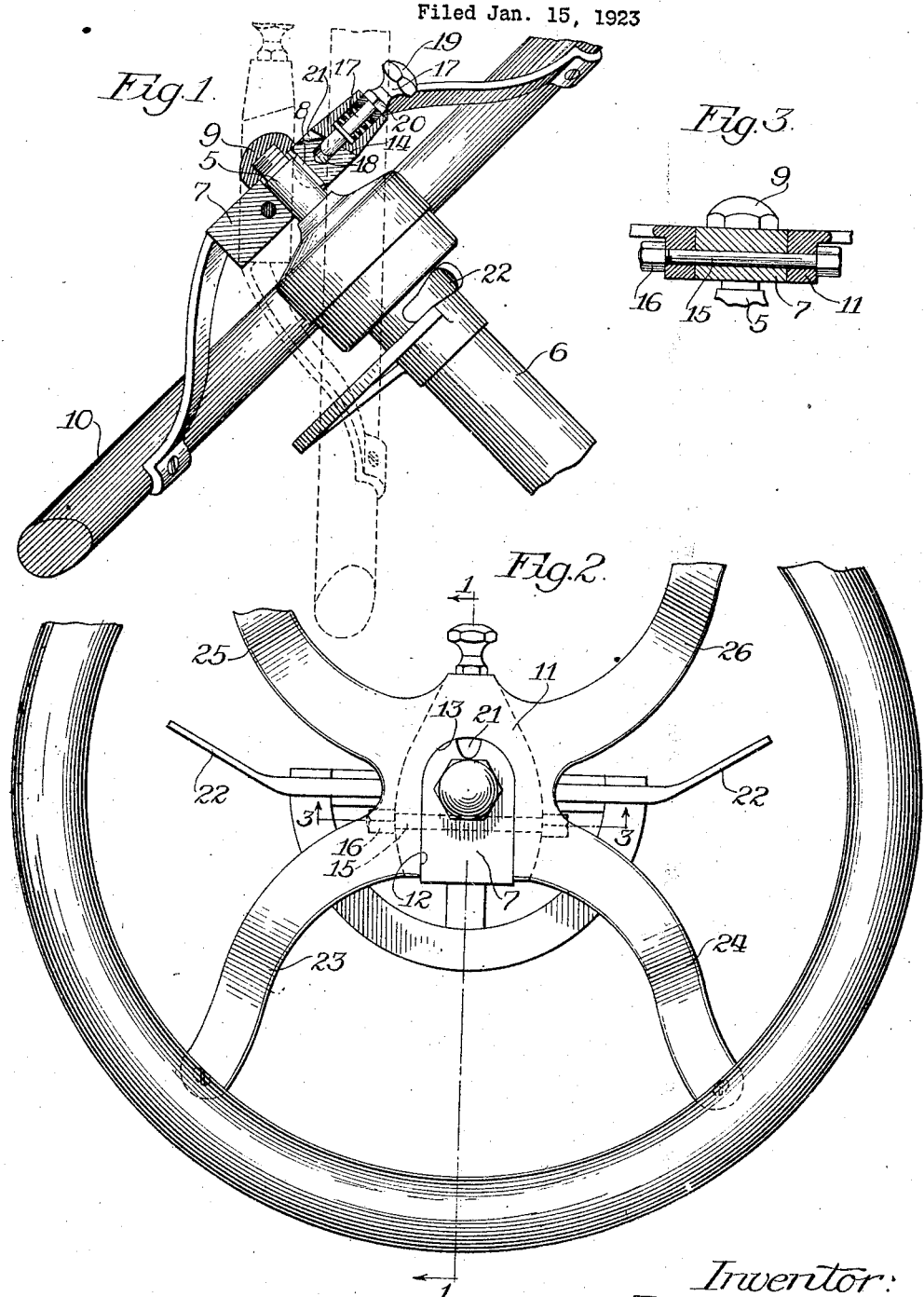

1,538,920

UNITED STATES PATENT OFFICE.

PERRY S. BAUER, OF CHICAGO, ILLINOIS.

TILTING STEERING WHEEL.

Application filed January 15, 1923. Serial No. 612,605.

*To all whom it may concern:*

Be it known that I, PERRY S. BAUER, a citizen of the United States, residing at Chicago, in the county of Cook and State of Illinois, have invented certain new and useful Improvements in Tilting Steering Wheels, of which the following is a specification.

This application is a continuation in part of my applications Serial No. 502,337, filed September 22, 1921 and Serial No. 532,362, filed January 28, 1922.

This invention relates to steering gears for automobiles and other motor driven vehicles and its principal object is to provide simple means of strong and substantial construction which can be easily operated to tilt the steering wheel to a position out of the way of the driver in entering or leaving the vehicle.

Further objects are to construct the steering wheel so that it can be readily and easily applied to a steering shaft; to enable parts to be adjusted to avoid rattling and to compensate for wear; to facilitate the restoration of the wheel from its tilted to its normal position without the necessity of manually withdrawing the locking bolt; and generally to improve the details of construction and the arrangement of parts whereby to provide a simple, compact and efficient device of substantial construction which can be manufactured economically and quickly and easily applied, without the necessity of employing the services of a skilled mechanic.

In the accompanying drawings I have illustrated a selected embodiment of the invention, and referring thereto Fig. 1 is a sectional elevation on line 1—1 of Fig. 2 showing a steering post and shaft with a steering wheel embodying my invention mounted thereon.

Fig. 2 is a top plan view, partly broken away, of the structure shown in Fig. 1.

Fig. 3 is a sectional view on the line 3—3 of Fig. 2.

Referring to the drawings, 5 is a steering shaft rotatably mounted in a steering column 6 and having a head 7 rigidly secured thereon by a key 8 and nut 9. The steering wheel comprises a rim 10 and a spider secured thereto and having its central part 11 made generally U-shaped with a bifurcation 12 therein to receive the head 7. This bifurcation is substantially oblong in shape having a rounded inner end 13 and opening through the hub of the spider at its other end. The inner end 14 of the head is rounded to correspond with the inner end 13 of the bifurcation 12 and this end of the bifurcation and the head is beveled as shown in Fig. 1. The head and bifurcation are made of a size to produce a snug fit to give that rigidity of parts which is highly desirable in steering gears, and the steering wheel is pivotally secured to the head by a bolt 15, which passes through the sides of the bifurcation, and also through the head between the steering post and the outer end of the head. This is preferably a headed bolt with a nut 16 and is adapted to be adjusted to preserve that snug working fit between the wheel and the head which is desired for steering wheels.

It is important that the head 7 and the bifurcation in the U-shaped or yoke hub of the steering wheel be shaped correspondingly to make a snug working fit, and these parts should be of substantial construction and the wheel should be capable of a pivotal movement relative to the head and steering shaft so that the wheel can be tilted out of the way of the driver in entering and leaving his seat opposite the steering wheel. The parts should be of substantial construction to eliminate danger of breaking the steering wheel or the connection between the steering wheel and the steering shaft, and they should be made to work easily and with a snug working fit to eliminate looseness of parts which may produce wear and rattling. I have accomplished these desirable advantages in this invention and I provide a strong and substantial connection between the wheel and the head on the steering shaft which can be adjusted as required to always provide a snug working fit. In commercial manufacture of my invention I have found that the curved, beveled end of the head and the correspondingly curved beveled end wall of the bifurcation in the hub not only provide a snug working fit, but their broad contact surfaces in conjunction with their peculiar shape also give that solidity of fit which is so highly desirable in a steering wheel and especially so in a tilting wheel; and the bolt provides that simple adjustment which enables the snug fit to be maintained at all times, besides furnishing a substantial means for securing the wheel to the head.

A spring pressed bolt 17 is housed within the hub of the steering wheel and projects through the beveled end wall of the bifurcation in the hub and engages a socket 18 in the beveled end wall of the head 7. The knob or head of this bolt projects outward in a convenient position to be grasped by the driver for withdrawing the bolt from locking engagement with the head. To prevent surreptitious removal of the knob or head I prefer to make it in two parts 19, 20, both of which threadedly engage the bolt. The outer part 19 may be tightened on the bolt against the inner part 20, which will thereafter act as a lock nut so that without the use of suitable tools the knob or head cannot be removed from the bolt, because the bolt will turn with the knob or head. When it is desired to remove the knob or head one part can be held while the other part is unscrewed.

In the tilted position of the wheel, as shown in broken lines in Fig. 1, the locking bolt will of course be released and project beyond the inclined wall of the opening in the hub. It is desired to avoid the necessity for manually withdrawing the bolt in restoring the wheel from tilted to operative position, and to this end I cut out or groove the head at 21' where the bolt engages the head to provide a track or guide having a gradual incline or slope for the bolt to travel on so that it can be easily forced back against the tension of its spring when the wheel is swung from its tilted or open position to its operating position, and since the bolt registers with the opening 18 in the head it will be forced therein by its spring to lock the wheel in its operative position. This is an important feature of my invention because it enables the wheel to be restored to operative position by a one-hand movement without the necessity of employing the other hand to withdraw the bolt during the closing movement of the wheel, and at the same time the structure is such that this can be accomplished without straining or unduly wearing the parts.

I have shown my invention applied to a steering shaft having the control levers 22 located below the steering wheel, but it will be understood of course that the invention can be used for any type of steering control to which it can be adapted. With the control illustrated it is desirable to shape the spider so that the wheel can be tilted without in any way interfering with the control levers and for the type of control shown in the drawings, and for others, the crowned spider shown is particularly desirable and has so proven in commercial use. This spider has four arms, 23, 24, 25 and 26; the two arms 23 and 24 are connected to the hub at the open end of the bifurcation 12 therein and form a bow in general outline and effect; the two arms 25 and 26 are connected to the hub at the inner end of the bifurcation 12 therein and also form a bow in general outline and effect; and the four arms are curved upwardly to form a spider of general crown shape with the hub elevated above the outer ends of the arms, to which the rim 10 is fastened. In a general installation of my invention with the type of control illustrated, the arms 23 and 24 would project outward in the general direction of the driver in the driver's seat, and the two arms 25 and 26 will project upward, and the control levers 22 will project outward below and between the arms 25, 23, and 26, 24, so that it will be readily seen that the wheel can be tilted without interfering in any way with the control levers.

My invention provides a strong and substantial and easily operated tilt wheel which can be readily applied to a steering shaft and column for immediate use; it provides a broad, substantial, snug working fit between the head and the hub of the wheel which permits the wheel to swing freely on the head to and from tilted position and to be rigidly seated in closed operative position so that there will be no play between these parts in the steering of the car. This is not only important to prevent wear and rattling as hereinbefore pointed out, but it is equally important in providing that security and rigidity in a steering wheel which is so greatly to be desired in motor driven vehicles for ordinary travel, and particularly for emergencies.

In the ordinary commercial use of my invention I have found that the structure as herein shown is very satisfactory, but I am aware that changes in the form, construction and arrangement of parts can and may have to be made from time to time to adapt the invention for use in connection with other steering mechanisms, and I reserve the right to make all such changes as fairly fall within the scope of the following claims.

I claim:

1. In combination, a steering wheel having a bifurcated hub, the inner end of said bifurcation being U-shaped and beveled from top to bottom, a steering shaft, a head on said shaft and received within said bifurcation, said head having one end curved and beveled to correspond with the inner end of said bifurcation and to fit snugly therein, and a pivot passing through said head and the sides of said bifurcation.

2. In combination, a steering wheel having a bifurcated hub, the inner end of said bifurcation being U-shaped and beveled from top to bottom, a steering shaft, a head on said shaft and received within said bifurcation, said head having one end curved and beveled to correspond with the inner end of said bifurcation and to fit snugly therein, a bolt passing through said head and the sides of said bifurcation to pivot said hub to said head and to provide means for adjustment to take up wear between said hub and said head.

PERRY S. BAUER.